(No Model.)

C. C. REYNOLDS.
CULTIVATOR AND PULVERIZER.

No. 484,239. Patented Oct. 11, 1892.

Witnesses,

Inventor,
Christopher C. Reynolds
By Dewey & Co.
Attys

UNITED STATES PATENT OFFICE.

CHRISTOPHER COLUMBUS REYNOLDS, OF KELSEYVILLE, ASSIGNOR OF ONE-HALF TO J. C. PLUNKETT, OF OAKLAND, CALIFORNIA.

CULTIVATOR AND PULVERIZER.

SPECIFICATION forming part of Letters Patent No. 484,239, dated October 11, 1892.

Application filed December 22, 1891. Serial No. 415,904. (No model.)

*To all whom it may concern:*

Be it known that I, CHRISTOPHER COLUMBUS REYNOLDS, a citizen of the United States, residing at Kelseyville, Lake county, State of California, have invented an Improvement in Cultivators and Pulverizers; and I hereby declare the following to be a full, clear, and exact description of the same.

My invention relates to an apparatus which I call a "cultivator and pulverizer."

It consists of a series of cultivator-teeth adjustably mounted and supported from a traveling sulky-frame and in conjunction therewith of an adjustable crushing-roller, and in certain details of construction which will be more fully explained by reference to the accompanying drawings, in which—

Figure 1:
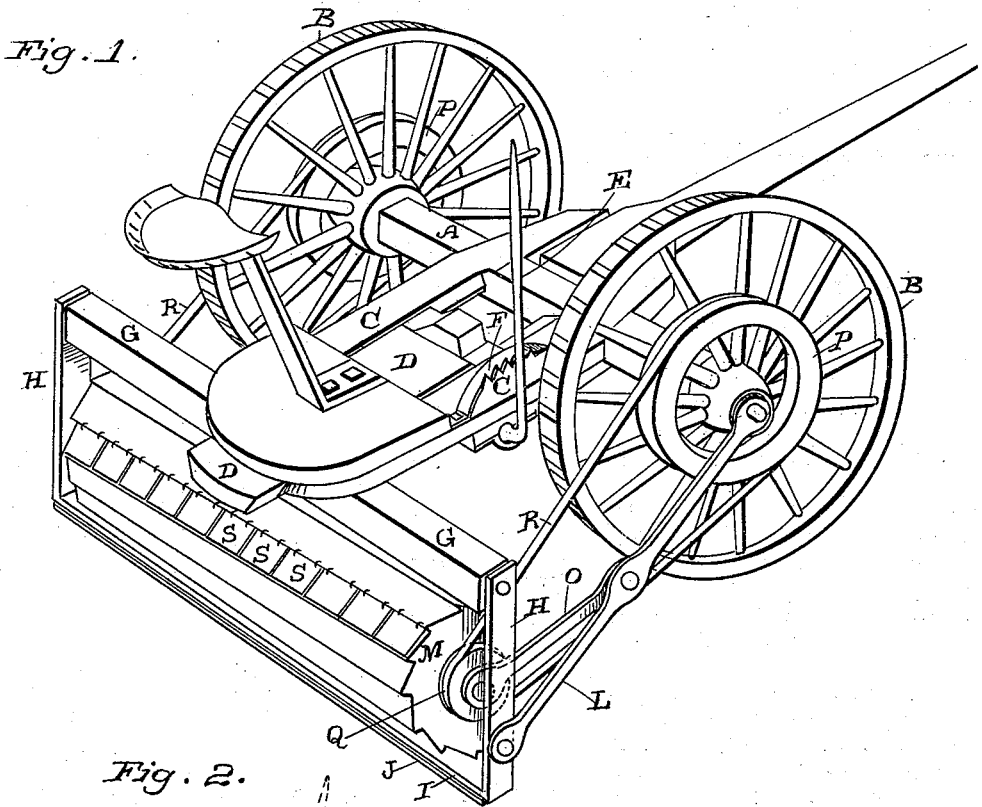
Figure 2:
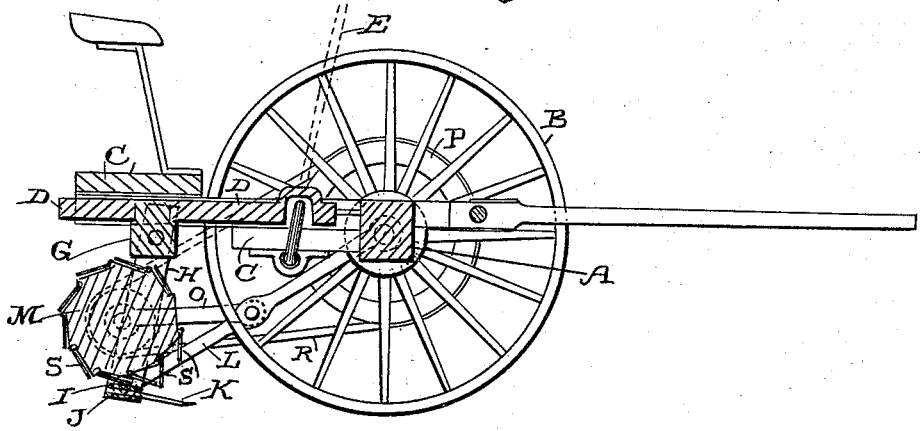

Figure 1 is a perspective view of my improved cultivator and pulverizer. Fig. 2 is a longitudinal sectional view of the same.

A is an axle having wheels B B journaled upon each end. A suitable frame C is secured to this axle, extending rearwardly and forming guides, between which the sliding frame D is caused to travel. This frame is moved by a crank-shaft and a lever E, which is fulcrumed or journaled upon the frame C and connects with the slide, so as to move it backward or forward. A toothed rack F serves to hold this lever at any desired point of adjustment. The sliding frame D carries a timber G, extending across the rear of the machine, and from the ends of this timber the arms H extend downward and at the bottom are connected by the double bars I J, between which the teeth K are clamped. These cultivator-teeth are preferably made double-ended, and they are securely clamped between the bars I J by screws or otherwise, so that the free ends of the teeth will project toward the front. These teeth may be reversed at any time when worn or for other reason by simply loosening the clamping devices, removing them, and turning them around. From the lower ends of the arms H the inclined arms L extend up to the outer ends of the axle B, being loosely pivoted at each point, so that they act as fulcrums, about which the teeth are turned to raise or depress their points by the movement of the slide D and the bar G. This causes the teeth to take more or less of the ground, as may be desired.

M is a roller extending across behind the machine and above the cultivator-teeth. The ends of this roller are journaled in the outer ends of arms O, the inner ends of these arms being pivoted to the arms L, so that the roller may be raised or depressed about these points as centers of movement.

Upon the outer ends of the bearing-wheels B are belt or chain pulleys P, and similar pulleys Q are fixed to the ends of the roller, so that belts or chains R, passing around these pulleys, serve to rotate the roller when the machine is passing over the ground. This roller may be solid or it may have spokes or spiders at each end with longitudinal staves extending between them and forming the periphery of the roller.

The roller may be plain or corrugated; but I prefer to make it with elastic plates S, hinged to it in such a manner that these plates serve as crushers or rubbers when they pass over the cultivator-teeth by the rotation of the roller. The operation of these crushing-plates will be as follows: As they pass over the top of the roller and down upon the front side the hinges allow them to turn over, so that they will engage any lumps or large pieces of earth and sweep them under the roller at the point where it passes over the cultivator-teeth and the bars I and J, where the clods will be crushed and pulverized and then delivered upon the ground at the rear of the machine. The advantage of hinging these plates and making them elastic is especially seen where there are rocks or substances which cannot be crushed, and if these pass between any one of the elastic plates and the cultivator that plate will yield sufficiently to leave space for the rock to pass, while the remainder of the plates, encountering only material which can be crushed, will continue to act upon this material and crush it without reference to the size of the stone which may be passing under the other plate. Without the use of these elastic plates the whole roller would be lifted up by such a rock, and any clods which might be passing through other parts of the roller at that time would escape without being crushed.

The roller may be hinged or supported in various ways; but I prefer to support it by arms from the axle ends, in order to keep the driving belts or chains taut, whatever may be the position of the roller.

It will be manifest that the movements of the tooth-carrying frame may be effected by means of a spur-gear fixed upon the shaft in place of the crank and a rack secured to the sliding frame D and engaging the gear, the action of the gear-teeth upon the rack being the same as that of the crank.

Having thus described my invention, what I claim as new, and desire to secure by Letters Patent, is—

1. A cultivator and pulverizer consisting of the main frame, a frame longitudinally slidable thereon and having a depending frame at its rear provided with cultivator-teeth which are raised and lowered by the movement of the sliding frame, a crushing-roller within the depending frame and above the plane of the cultivator-teeth, and means for rotating the roller to pulverize clods passing between the roller and teeth, substantially as herein described.

2. A cultivator and pulverizer consisting of a frame mounted upon bearing-wheels, a frame slidable longitudinally upon the main frame and having a vertical frame depending from its rear end, cultivator-teeth supported from said vertical frame extending horizontally across the rear of the machine, a mechanism whereby the slidable frame is moved so as to raise or depress the points of the cultivator-teeth, arms extending rearwardly from the wheel-shafts, a roller journaled at the rear ends of said arms above the cultivator-teeth and their supporting-bars, and pulleys and belts by which said roller is rotated from the main bearing-wheels of the machine, substantially as herein described.

3. A cultivator and pulverizer consisting of a frame mounted upon bearing-wheels, a sliding frame adapted to move forward and backward upon the main frame, arms extending downwardly from said sliding frame having the lower ends connected by horizontal bars extending across the rear of the machine, double-ended cultivator-teeth fitting between said bars and means for clamping them therein, fulcrumed arms extending from the lower ends of the cultivator-tooth frame to the ends of the main-wheel shaft and serving as fulcrums for said frame, and a lever by which the upper part of the sliding frame is moved backward or forward, whereby the cultivator-teeth are raised or depressed, substantially as herein described.

4. A cultivator and pulverizer consisting of a frame mounted upon bearing-wheels, a supplemental frame, a guide upon which said supplemental frame is movable backward and forward upon the main frame, arms depending from the ends of the supplemental frame and bars extending horizontally between the lower ends of said arms behind the machine, reversible cultivator-teeth clamped between said bars, fulcrum-arms extending from the lower ends of the side bars to the ends of the main-wheel axle, and a lever by which the upper part of the supplemental frame is moved backward and forward to raise or depress the points of the cultivator-teeth, arms O, extending rearwardly from the fulcrum-arms, a roller journaled between the ends of said arms, and pulleys and belts whereby said roller is rotated from the main wheels, said roller being free to rise and fall with relation to the cultivator-teeth and the clamping-bars, whereby clods which are raised by the teeth are pulverized by the roller, substantially as herein described.

5. A cultivator and pulverizer consisting of the main and supplemental frames mounted upon the bearing-wheels, cultivator-teeth supported from the supplemental frame and extending across the rear of the machine, so as to dig up and cultivate the soil and adjustable by movement of the supplemental frame, a second framework, a roller journaled therein above the cultivator-teeth and their supporting-bars, said roller having the independently-hinged plates attached to it around its periphery from end to end, whereby said plates are allowed to yield to stones or other hard substances, substantially as herein described.

In witness whereof I have hereunto set my hand.

CHRISTOPHER COLUMBUS REYNOLDS.

Witnesses:
S. M. PINER,
G. W. VAN DEVENTER.